Patented Jan. 19, 1954

2,666,715

UNITED STATES PATENT OFFICE 2,666,715

METHOD FOR DETERMINING AND MIXING COLORS

Otto Syreeni, Helsinki, Finland

No Drawing. Application July 29, 1949,
Serial No. 107,635

Claims priority, application Sweden
February 21, 1946

3 Claims. (Cl. 106—309)

The invention relates to first determining the colours with regard to both their hue and intensity and then mixing the colours according to this new determination method. This invention is intended for use in the dye-stuff industry, dyeing trade and everywhere where dye stuffs and colours generally are used.

It is well known that by mixing yellow and red and blue, either two of them together or all three, all the other colours are obtained. According to this invention the main primary colours are bright yellow, neither reddish nor greenish, bright red, neither yellowish nor blueish and bright blue, neither reddish nor yellowish.

The method of determining the reciprocal colour intensity ratios of these three main primary colours equal with one another forms the basis of this invention. Thus e. g. the colour intensities of yellow, red and blue are determined as equal when first on adding equal colour intensity amounts of red and blue to a stronger yellow, the yellow only deepens turning neither yellowish blue nor yellowish red, secondly, on adding equal colour intensity amounts of yellow and blue to a stronger red, the red only deepens turning neither yellowish nor blueish and thirdly on adding equal colour intensity amounts of yellow and red to a stronger blue, the blue only deepens turning neither greenish nor blueish. In practice this determination was carried out by making at equal quantity intervals a series of dyeings or paintings. Red (e. g. 0.2% of Pontacyl Carmine 2G) and blue in different ratios (e. g. 0.125%, 0.130% . . . 0.160% of Du Pont Anthraquinone Blue B) were added to a stronger yellow dye-stuff (e. g. 2–3% Pontacyl Light Yellow 3G). The thus obtained colours were arranged in such a way that they could easily be compared with each other. In this way it was possible to determine the turning point where reddish yellow turns greenish. At the turning point the intensity ratio between the red and blue colour is the same. This was tested anew by making another series of dyeings with varying amounts of red and fixed amounts of blue. In accordance with the above stated the intensity ratio of the yellow and blue in the stronger red and that of the yellow and red in the stronger blue was determined. The control dyeing series for the last mentioned colours were then accomplished. All the thus obtained determinations, called contrast colour determinations here, afforded the means by which the reciprocal intensity ratio of the colours could be determined very accurately.

Because the determination of colour intensities in percents would involve apparent difficulties, it was necessary to take into use colour intensity units. For example (for wool) the following 1000 unit colours have been used as such units based on the aforementioned contrast colour determination according to the invention:

1.175% dyeing with Pontacyl Light Yellow 3G
0.950% dyeing with Pontacyl Carmine 2G
0.675% dyeing with Du Pont Anthraquinone Blue B Such a 1000 unit dyeing is medium intense and can be looked upon as normal or basic intensity. In practise the whole unit numbers suffice and it is not necessary to use fractions because the minutest difference in change perceptible to the human eye in favourable conditions is about one colour unit in a thousand unit colour intensity class.

When the bright primary colours have thus been determined, the dividing of the colour ring is commenced. It is best to take first the intermediate hues for yellow, red and blue i. e. middle orange, middle violet and middle green—thus dividing the colour ring into six parts. Between these colours again the intermediate colours are chosen, thus dividing the colour ring into 12 parts and likewise further into 24 parts, 48 parts and further into 96 parts. A colour ring divided into 96 parts may be considered adequate enough for the purpose and since the human eye is unable readily to discern smaller differences in colour, this 96 colour ring forms the basis for the division of the colour ring.

In this case the colour ring is divided in such a way that the intervals (or distances) from the yellow to the red, from the red to the blue and from the blue to the yellow are just as great. Thus the numbers of the primary colours will be: yellow position number 1, red position number 33 and blue position number 65. Endeavours have been made to place the intermediate colours on the colour ring in such a way that transition from one colour to another takes place smoothly, with equal distances, according to perception with the eye. On the basis of experiments performed, a distinct regularity has been found to exist for the changing of the colour ratio on passing from one hue to another. In fact, endeavours have been made to find such mathematical formulas by means of which the dividing of the colour ring can be effected. These division formulas must be based on ordinary numbers. When the division of the colour ring observes mathematical exactly defined rules, the advantage inter alia is attained that the distances or intervals of the ordinary numbers i. e. the colour ratios of the intermediate colours will also be exactly determined. When e. g. the quantities of blue from position number 33 to position number 49, the total intensity being 1000 colour units, can be calculated from the formula $$(n-32)^2+13.25(n-32)-14.25$$

(from red position number 33 to middle violet position number 49) it is possible to calculate if some hue should happen to be, say, position number 33, 25, the quantity of blue in it by substituting for the $n$ of the formula the number 33, 25 in question. The obtained quantity of blue subtracted from a thousand gives the unit quantity of red. In like manner it is possible to calculate the number attached to a bright hue of the quantity of red and blue contained in it is known. When the bright colours have thus been determined the deepening or darkening of the colours may now be dealt with in the following.

A colour containing equal colour units of yellow, red and blue is called in the colour determining and mixing method according to this invention a softener or softening brown, and a colour with added softener is called a softened colour. According to this invention the softening of colours is effected by means of the softener or softening brown.

On adding softening brown to some hue, the colour in question whatever it be only deepens, but the basic hue of the colour remains the same. Since the use of this softening brown is one of the chief features of this invention, an example for the elucidation of the same is proper. If e. g. equal quantities of softening brown are added to the equally intense colours of the bright colour ring a dark colour ring, wherein the original hues have maintained their positions, is obtained. Thus e. g. the original reddish yellow has maintained its reddish hue, the greenish yellow its greenish hue etc. In the thus obtained colour ring at equal distances the colours change in order on passing from one colour to the other, but these distances diminish with the growing use of the softening brown until finally all colours unite in the softening brown which contains, as mentioned above, all the primary colours, yellow, red and blue in equal quantities.

In order to facilitate the determination of the softened colours, the colours may be divided into softened groups; thus each softened group would represent some certain darkened grade or degree. Such groups have been determined by adding to e. g. a 1000 unit colour 2%, 4%, 8%, 16% etc. $2^n\%$ of softening brown whereat 2 denotes the percentage and $n$ the ordinary number of the softened group. Thus e. g. in the softened group 4 there is $2^4\%=16\%$ of softener, i. e. 1000 units colour and 160 units softener. Therefore, if the original colour were e. g. middle green, i. e. it would contain 500 units yellow, 0 units red and 500 units blue, indicated in short $$500+0+500(=1000)$$

and the softener would contain $$53\tfrac{1}{3}+53\tfrac{1}{3}+53\tfrac{1}{3}=(160)$$

the resulting sum being $$553\tfrac{1}{3}+53\tfrac{1}{3}+553\tfrac{1}{3}(=1160)$$

This sum can be calculated to the 1000 unit intensity by multiplying it with $$\frac{1000}{1160}$$

Contrarily the colour and hue in question can be calculated if the unit quantity of yellow, red and blue contained in it is known. The basis of division here as also that of the colour ring is coupled to the formula $(2^n\%)$. This makes possible, whenever necessary, the easy calculation of the values of the intermediating softenings and that the dividing distances as estimated with the eye will appear just as great.

It is now possible to determine all the possible colours and hues existing on the three-colour basis described above. The determination may be made known with three numbers which stand for the unit quantities of the yellow, red and blue colours, or by stating the colour intensities, i. e. the total colour unit quantity and to what number of the colour ring and to what number of the softening group the colour in question as 1000 units intense corresponds.

In addition to determining the different bright and softened colours according to the three colour system, the determining of the colouring power of different dye-stuffs will be determined as to their yellow, red and blue content. This so-called division into units of dye-stuffs is easily accomplished with a few laboratory tests. Completely carried out this invention, however, implies that all the dye-stuffs have already been divided into units in the factories and that the unit intensities accompany each packing or are stated in the offers, bills etc. The unit intensities may be stated e. g. as yellow, red and blue unit quantities of a 1% dyeing. On the basis of these unit numbers the hue and the intensity of the colour in question can be accurately determined by means of a colourchart according to the invention.

On making a colourchart according to the above stated colour determining and mixing method, be it observed that although relatively bright colours, less used in practise because of their unfastness etc., are chosen for the bright yellow, red and blue, according to which all the other colours are determined, the actual colour determination and mixing does not suffer from it. According to the invention the mixing of colours is not intended to take place only between these three primary colours, which thus in a way are only symbols. The merit achieved by dividing all the colours or dye-stuffs used for mixtures into units in this method makes possible the use of any dye-stuffs or colours whatever as long as the colour desired each time is produced, i. e. the desired yellow, red and blue unit quantity. Just in this respect this invention differs sharply from all other similar inventions.

When dividing dye-stuffs and colours into units it is also to be observed that it is possible to adopt into use primary colours having different degrees of brightness or purity, i. e. yellow, red and blue. here is cause to match these together in such a way that the different bright primary colours are differentiated from each other in specified ratios and are thus divided into separate softening groups, just as all the other tinges.

Thus if in the paint-stuff field e. g. I. G. Hansagelb 10 G were chosen as the brightest yellow colour then e. g. the purest possible chromium yellow as the second brightest and, e. g. I. G. Eisenoxydgelb 910 as the third brightest, the softening groups of both chromium yellow and iron oxide yellow could be measured according to the softening brown unit amount requisite for converting Hansagelb 10 G into the same softened group as the last-mentioned. In this way, by means of softening brown, distinct purity measure ratios can be created between the different primary colours.

In addition to commercial dyestuffs naturally also the yellow, red and blue of the spectrum of light (or matter) of specific strength can be chosen as chief primary colours. Thus it is also possible to determine, by physical means and in the way set forth in this invention, the mutual intensity ratio between these chief primary colours, to take the desired unit intensity and divide the bright colour ring with the desired accuracy and soften the last-mentioned gradually up to softening brown.

If, in order to prepare sample cards according to the invention, we should select for producing bright colour mixtures:

(a) For wool—

Auramin O Conc. (Holliday),
Rhodamin B (I. G.),
Victoriablue B. S. (Holliday), and the 1% Auramin O Conc. dyeing would be indicated according to the invention by numbers 1000+0+0, the unit numbers of an about 1.5% Rhodamin B dyeing would be 0+1000+0 and the unit numbers of an about 0.15% Victoriablue B. S. dyeing would be 0+0+1000, dyed in an about thirtyfold dye bath.

(b) For cotton etc. the same colours with Tannin-antimony potassium tartrate pretreatment and with Auxamin B aftertreatment or without.

(c) For cellulose or hard paper the same colours as a covering rubber roller printing-colour e. g. in the following composition:

$x$ gr. dyestuff
$x$ gr. tannin (spirit soluble)
Dissolved in 6 litres of alcohol each separately.

X being any predetermined quantity to give a desired shade or hue.

(d) As a common rubber roller printing-ink absorbable into paper the same colours e. g. in accordance with the following recipe:

$x$ gr. dyestuff
3 l. glycerine
0.5 l. GCP (solvent)

To the above homogeneously mixed dye bath 4 litres of boiling water is added and stirred until cooling point. To this is added, stirring continually, a solution prepared beforehand containing:

$2x$ gr. tannin (which is soluble in water as well as in alcohol)
2.5 l. alcohol.

(e) For printing-papers as a usual printing oil-colour the same basic colours as Tannin, Tamol etc. lacquers, or as Fanal-colours of I. G., e. g. Fanalgelb G supra plv., Fanalrose B supra and Fanalblau B supra plv. milled with hydrous alumina (in the ratio 15:10) and working it in a roll mill with bright, colourless printing-varnish and fully pure white-pigment into covering oil-colours or with hydrous alumina into transparent printing oil-colours.

Regarding the above-mentioned basic dyestuffs as a bright triad, on the basis of which the colour charts according to the invention and other corresponding appliances would be made, it would naturally be possible to ascertain for practical purposes own triads for mixing of colours less bright, but fast and therefore better applicable to practice. Those ought to be, however, divided into units on the ground of the unit numbers found in the bright colour charts made according to the invention. Thus a rather serviceable triad would be obtained e. g.

(a) For wool (Holliday):
About 1.5% fast light Yellow 5G approximately 975+10+15
About 1% Acetyl Rose 2G approximately 40+920+40
About 0.5% Alizarine Brilliant Blue B. S. approximately 50+50+900 dyed in a bath containing 20% Glauber's salt and 5% oxalic acid.

It will thus be possible to find out proper colour triads for nearly all the colour lines. They will be relatively cheap and meet normal fastness requirements, and by means of them all the other hues can be produced, except the fully bright ones. They ought to be divided into units, of course, in accordance with Auramin O, Rhodamin B and Viktoriablau B. S. In the following some of them in colours of I. G.:

(b) For cotton etc.:
Siriusgelb G
Siriusrot 4B
Siriuslichtblau G or

Benzoechtkupfergelb GGL
Benzoechtkupferrot RL
Benzoechtkupferblau GL with aftertreatment.

(c) For stuff made of linen and wool mixed:
Siriuslichtgelb 5G
Siriusrot 4B
Halbwollechtblau GL or Siriusgelb GC
Geranin G
Veganreinblau B (d) For acetate and viscous artificial silk, cotton, wool and silk:
Plurafilgelb R
Plurafilrot
Plurafilreinblau B (e) As oil- and glue-colours and lakes:
Chrome Yellow (light)
Hansarot
Prussian Blue (bright)

or

Hansagelb 10 and 5G
Litholechtscharlach B (or Litholrubin BK)
Heliomarin RL (or Heliogenblau B)

(f) As tempers-colours (suitable also for oil- and glue-triad):
Hansagelb 10G or 5G
Hansarot B or Litholechtscharlach B
Heliogenblau B (g) As nitro-cellulose lakes the same as above, except:
Heliogenblau NCB (h) As nitro-cellulose lacquers for automobile painting:
Encegelb CD
Encecarmin B
Enceblau G (i) As water soluble wood stains:
  Echtlichtgelb 3G
  Azogrenadin S
  Cyanantrol BGA
  or
  Auramin O conc.
  Rhodamin B (6G)
  Methylenblau BB (j) As spirit soluble wood stains:
  Zaponechtgelb CGG
  Zaponechtrot BB (or Zaponechtrosa B)
  Zaponechtblau 3G (k) As acid and basic colours for leather:
  Flavazin E 3 GL
  Lederechtrot BB
  Alizarindirektblau A (or AGG)
  or
  Auramin
  Rhodamin B
  Methylenblau BB (l) As top coats for leather:
  Corialzitron ER
  Corialrubin ERL
  Corialreinblau ER
  or
  Echtdeckgelb, neu konz.
  Echtdeckrubin neu konz.
  Echtdeckblau neu konz.

(m) For furs with tanning by the chromic-acid method dyed in 60–80° C. acid colours:
  Tartrazin O
  Echtrot AV
  Alizarindirektblau A
  or
  Walckgelb H5G
  Brillantlanafuksin GG
  Alizarinreinblau FFG (n) For fats and oils:
  Sudangelb 3G
  Sudanrot B
  Sudanblau G (o) For refreshing drinks and cosmetics:
  Chinolingelb extra bes. rein
  Echtrot E bes. rein
  Patentblau AE bes. rein (p) Vulcanic colours for rubber:
  Vulcanechtgelb 5GF
  Vulcanrubin BCF
  Vulcanblau 4GF
  or
  Kadmiumgelb
  Zinnober
  Ultramarin (r) As printing oil-colours covering or transparent:
  I { Hansagelb 10G
      Helioechtrubin FF extra (Helioechtrosa RL)
      Heliogenblau B
  II { Chrome Yellow
       Krapplack (made more beautiful with Fanalrosa)
       Prussian Blue This application is a continuation-in-part of copending application Serial No. 720,940, filed January 8, 1947, and now abandoned.

I claim:

1. The method of blending red, yellow and blue coloring materials to a desired color intensity and shade comprising determining the reciprocal color intensity of the given coloring components of the desired color to be obtained and then blending the colors quantitatively in the ratio of their reciprocal color intensities to produce the desired shade and hue, said reciprocal color intensity being determined by measuring the minimum critical quantity of the coloring material of unknown coloring power required to produce a coloring effect upon a substantially stronger color containing a shade modifying quantity of a weaker color other than the unknown coloring material other than merely deepening the color thereof, said stronger color being selected from the group consisting of bright red, bright yellow and bright blue, and said unknown color being a color of this group other than the stronger color.

2. The method of deepening and softening a color without changing the hue thereof comprising blending therewith a brown coloring material in quantity sufficient to produce the desired deepening, said brown color consisting of a mixture of bright red, bright yellow and bright blue coloring substances contained as a blend in said brown mixture in proportion to their reciprocal coloring intensity, said reciprocal color intensity being determined by measuring the minimum critical quantity of the coloring material of unknown coloring power required to produce a coloring effect upon a substantially stronger color containing a shade modifying quantity of a weaker color other than the unknown coloring material other than merely deepening the color thereof, said stronger color being selected from the group consisting of bright red, bright yellow and bright blue, and said unknown color being a color of this group other than the stronger color.

3. The method as defined in claim 1, wherein said colors selected from the group consisting of red, yellow and blue whose reciprocal color intensities have been determined are blended to a series of intermediate colors, arranged in a chart of said intermediate colors varying in hue from one basic color to the next, whereby the exact quantity of each color used in the blend to obtain the intermediate hue is directly available from said chart.

OTTO SYREENI.

References Cited in the file of this patent

UNITED STATES PATENTS

| Number | Name | Date |
|---|---|---|
| 2,184,125 | Patterson | Dec. 19, 1939 |
| 2,409,285 | Jacobson | Oct. 15, 1946 |

FOREIGN PATENTS

| Number | Country | Date |
|---|---|---|
| 118,435 | Great Britain | Aug. 26, 1918 |

OTHER REFERENCES

"Paint & Colour Mixing," Jennings-Spon & Chamberlain, New York, 1915; pages 47 and 48.

"The mixing of Colors & Paints," Vanderwalker F. Drake & Co., 1944, pages 146 and 162.

"Color to Order," Scientific American, May 1946, pages 219 and 220.